US009874743B1

(12) United States Patent
Hutchin

(10) Patent No.: US 9,874,743 B1
(45) Date of Patent: Jan. 23, 2018

(54) BEAM DIRECTING DEVICE

(71) Applicant: Optical Physics Company, Calabasas, CA (US)

(72) Inventor: Richard A. Hutchin, Reno, NV (US)

(73) Assignee: OPTICAL PHYSICS COMPANY

( * ) Notice: Subject to any disclaimer, the term of this patent is extended or adjusted under 35 U.S.C. 154(b) by 128 days.

(21) Appl. No.: 15/091,151

(22) Filed: Apr. 5, 2016

(51) Int. Cl.
*G02B 26/08* (2006.01)
*G02B 27/14* (2006.01)

(52) U.S. Cl.
CPC ..... *G02B 26/0891* (2013.01); *G02B 26/0816* (2013.01); *G02B 27/142* (2013.01); *G02B 27/145* (2013.01)

(58) Field of Classification Search
CPC ............ G02B 26/0883; G02B 26/0891; G02B 26/0816; G02B 27/142; G02B 27/145
USPC .......... 359/831, 833–834, 837, 209.1, 211.1, 359/211.5
See application file for complete search history.

(56) References Cited

U.S. PATENT DOCUMENTS

| 5,327,289 | A | * | 7/1994 | Watanabe | ................ | G02B 5/04 348/E9.008 |
| 5,625,499 | A | | 4/1997 | Chen | | |
| 6,836,364 | B2 | | 12/2004 | Dube et al. | | |
| 2001/0001250 | A1 | * | 5/2001 | Kanai | .................... | G02B 23/14 359/431 |
| 2006/0279827 | A1 | | 12/2006 | Hutching et al. | | |

* cited by examiner

*Primary Examiner* — James Phan
(74) *Attorney, Agent, or Firm* — The Belles Group, P.C.

(57) ABSTRACT

A beam directing device includes a transmissive element having an entry surface disposed in a first plane and an exit surface disposed in a second plane, the first and second planes intersecting to form a wedge angle. A first coating on the entry surface transmits a predetermined spectrum of light incident upon the first coating from external to the transmissive element at a normal angle of incidence and reflects the predetermined spectrum of light incident on the first coating from within the transmissive element at two times the wedge angle. A second coating on the exit surface reflects the predetermined spectrum of light incident on the second coating from within the transmissive element at the wedge angle and transmits the predetermined spectrum of light incident on the second coating from within the transmissive element at three times the wedge angle.

28 Claims, 3 Drawing Sheets

BEAM DIRECTING DEVICE

FIELD OF THE INVENTION

The field of the present invention relates to beam directing devices which are able to deviate an incident light beam away from the angle of incidence.

BACKGROUND OF THE INVENTION

Many systems that use lasers to engage or image a remote target also require mechanisms for steering and directing the laser light over a wide operational field of view. In a typical such system, it is desirable to project a high power beam, typically 30-50 cm in diameter or more, over a wide field of view such as a 90-120 degree cone. Currently many high energy laser (HEL) systems use turrets as beam directors. A turret is usually large, heavy and disruptive to the aerodynamic properties of the platform it is mounted on. Turrets typically require a volume approximately three times the beam diameter on each side. In addition, a turret is usually mounted exterior to the carrying platform (e.g., an aircraft), and due to its wide volume of swing, it can substantially impair aerodynamic performance which effectively eliminates the option of supersonic HEL operation. One example is the Airborne Laser (ABL) laser turret mounted on the nose of a Boeing 747-400F aircraft. This turret is a large structure with a complex design. It measures 1.5 meters in diameter and weighs 12 to 15 thousand pounds.

In view of the beam directors that are currently in use, and the platforms they are used on, it is desirable to have a beam director which can be made smaller and has a significantly reduced weight.

Transmissive beam directors have the advantage of being able to be more compact than reflective beam directors. At present, the only optical material that has a low absorption and does not substantially thermally aberrate when used as part of an HEL system is low absorption fused silica. However, because of the low refractive index of fused silica, the prisms in prism-based beam directors end up being extremely thick and very heavy when the diameter of the beam director approaches 50 cm.

SUMMARY OF THE INVENTION

The present invention is directed toward a beam directing device in the form of a transmissive element having a wedge shape with a coating on the entry surface and the exit surface. The coatings serve to cause multiple reflections of light within the wedge-shaped transmissive element, such that the emerging beam deviates from the angle of incidence on the entry surface. Such a beam directing device enables a beam director to have both a compact and lightweight design while still achieving a significantly large cone of regard.

In a first separate aspect of the present invention, a beam directing device including: a transmissive element having an entry surface disposed in a first plane and an exit surface disposed in a second plane, wherein the first and second planes intersect to form a wedge angle; a first coating on the entry surface, the first coating configured to substantially transmit a predetermined spectrum of light incident on the first coating from external to the transmissive element at about a normal angle of incidence and to substantially reflect the predetermined spectrum of light incident on the first coating from within the transmissive element at about two times the wedge angle; and a second coating on the exit surface, the second coating configure to substantially reflect the predetermined spectrum of light incident on the second coating from within the transmissive element at about the wedge angle and to substantially transmit the predetermined spectrum of light incident on the second coating from within the transmissive element at about three times the wedge angle.

In a second separate aspect of the present invention, a beam directing device includes a transmissive element having an entry surface disposed in a first plane and an exit surface disposed in a second plane, wherein the first and second planes intersect to form a wedge angle; a first coating on the entry surface, the first coating configured to substantially transmit a predetermined spectrum of light incident on the first coating from external to the transmissive element at about a normal angle of incidence and to substantially reflect the predetermined spectrum of light incident on the first coating from within the transmissive element at greater than a first predetermined angle which is greater than the wedge angle; and a second coating on the exit surface, the second coating configure to substantially reflect the predetermined spectrum of light incident on the second coating from within the transmissive element at a reflection angle which is less than a second predetermined angle and to substantially transmit the predetermined spectrum of light incident on the second coating from within the transmissive element at a transmission angle which is greater than the second predetermined angle.

In a third separate aspect of the present invention, a beam director includes: a first beam directing stage and a second beam directing stage, each beam directing stage including: a transmissive element having an entry surface disposed in a first plane and an exit surface disposed in a second plane, wherein the first and second planes intersect to form a wedge angle; a first coating on the entry surface, the first coating configured to substantially transmit a predetermined spectrum of light incident on the first coating from external to the transmissive element at about a normal angle of incidence and to substantially reflect the predetermined spectrum of light incident on the first coating from within the transmissive element at greater than a first predetermined angle which is greater than the wedge angle; and a second coating on the exit surface, the second coating configure to substantially reflect the predetermined spectrum of light incident on the second coating from within the transmissive element at a reflection angle which is less than a second predetermined angle and to substantially transmit the predetermined spectrum of light incident on the second coating from within the transmissive element at a transmission angle which is greater than the second predetermined angle, wherein: the first beam directing stage has a first axis of rotation, and the second beam directing stage has a second axis of rotation, such that each beam directing stage is rotatable with respect to the other beam directing stage; an axis of rotation of the second beam directing stage is parallel to an exit angle associated with the transmissive element of the first beam directing stage; and the entry surface of the transmissive element of the second beam directing stage is orthogonal to the axis of rotation.

Accordingly, an improved beam directing device is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
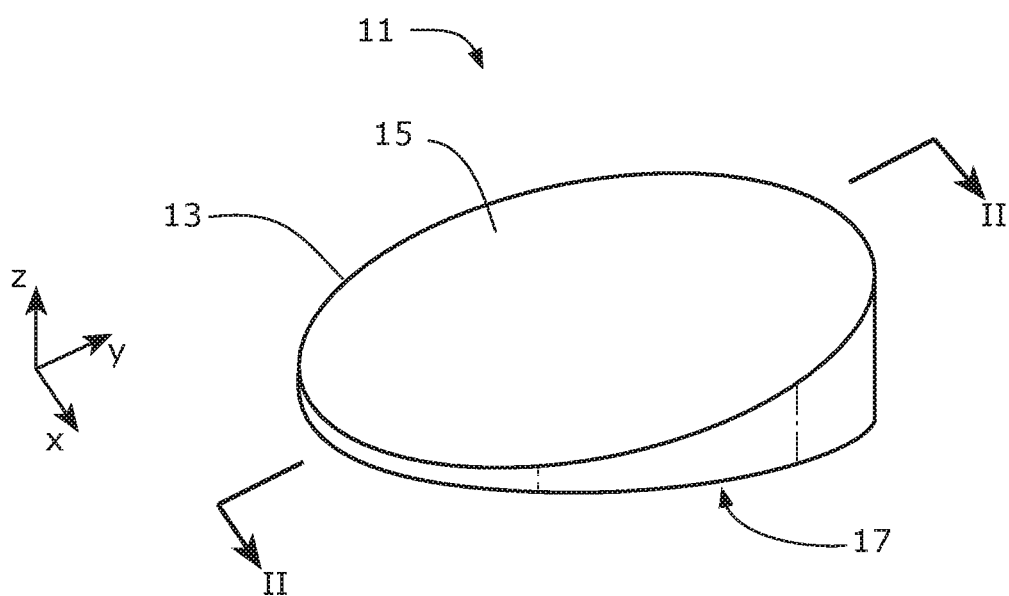
FIG. 1 is a perspective view of a beam directing device.
Figure 2:
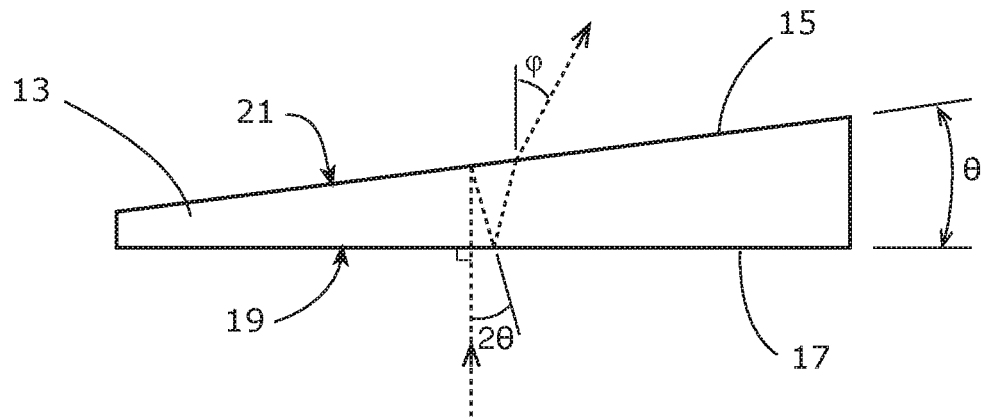
FIG. 2 is a sectional view of the beam directing device along the line II-II of FIG. 1.

Turning in detail to the drawings, FIG. 1 illustrates a beam directing device 11 that is formed from a transmissive element 13 having surface coatings as described below. The transmissive element 13 has a trapezoidal cross section in the y-z plane, as is shown in FIG. 2, and a circular cross section in the x-y plane. The cross section in the y-z plane is that of an irregular trapezoid, with the major sides of the transmissive element 13 being defined by an entry surface 15 and an exit surface 17. The entry surface 15 is disposed within a first plane, and the exit surface 17 is disposed within a second plane, such that the two planes intersect to form a wedge angle, $\theta$. The wedge angle, $\theta$, may be any desired angle greater than 0° and less than about 22°, as the wedge angle contributes to the amount of angular deviation, $\psi$, between light exiting the transmissive element 13 through the exit surface 17 and light entering the transmissive element 13 through the entry surface 15 at approximately a normal angle of incidence. For embodiments in which the index of refraction of the transmissive element 13 is the same as the index of refraction of the medium in which the beam directing device 11 operates, then the angular deviation, $\psi$, will be equal to two times the wedge angle, $2\theta$. For embodiments in which the index of refraction of the transmissive element 13 is different from the index of refraction of the medium in which the beam directing device 11 operates, then the angular deviation, $\psi$, will be equal to two times the wedge angle, $2\theta$, plus an angular factor resulting from the transition from the transmissive element 13 to the external medium.

Smaller wedge angles may be preferred for many applications, as a smaller wedge angle will result in a device having a smaller size. For certain embodiments which are to be used in HEL applications, a wedge angle of about 7.2° may be desirable. The overall shape of the transmissive element 13 may vary, depending upon the purpose of the application, with the constraint that both the entry surface 15 and the exit surface 17 are planar and each is disposed within respective planes that intersect to form an angle.

The transmissive element 13 may be formed from a material that has low absorption in the operational spectrum of the beam directing device 11 and has an index of refraction greater than 1. In general, the index of refraction for the transmissive element should be equal to or greater than the index of refraction of the medium in which the beam directing device 11 is intended for operation. For embodiments which the beam directing device 11 operates in standard atmosphere (which has an index of refraction of about 1), the transmissive element 13 may have an index of refraction of at least 1. In certain embodiments, the index of refraction of the transmissive element 13 may be greater than 1.4. In general, the greater the index of refraction of the transmissive element 13 as compared to the index of refraction of the medium in which the transmissive element 13 operates, the smaller the wedge angle of the transmissive element can be to achieve comparable exit angle results. In certain embodiments, the transmissive element 13 may be formed from fused silica ($SiO_2$), which has a refractive index of 1.46. Fused silica is particularly well suited for HEL applications because it has low absorption at the operational wavelength of the typical HEL, which is typically centered at 1.06 µm. In certain other embodiments, particularly those in which absorption is not quite as much of an issue, the transmissive element 13 may be formed from materials such as Zinc Sulphide (ZnS) and Borosilicate glass (BK7), or almost any other appropriate transmissive material.

The entry surface 15 has a first coating 19, and the exit surface 17 has a second coating 21. The first coating 19 is selected and/or designed to have specific transmission and reflection properties. Specifically, the first coating 19 is selected and/or designed to substantially transmit light in a designated spectrum that has about a normal angle of incidence on the first coating 19 from external to the transmissive element 13. As used herein, substantial transmission means at least 99% transmission. For HEL applications, it may be desirable for the first coating 19 to transmit at least 99.95% of normally incident light in the designated spectrum. At the same time, the first coating 19 is also selected and/or designed to substantially reflect light in the designated spectrum that is incident on the first coating 19 from within the transmissive element 13 at a first predetermined angle that is greater than the wedge angle. In certain embodiments, the first predetermined angle may be twice the wedge angle. As used herein, substantial reflection means at least 99% reflection. For HEL applications, it may be desirable to have the first coating 19 reflect at least 99.95% of light in the designated spectrum. The designated spectrum may be as narrow as one to several wavelengths. In certain embodiments, the designated spectrum may include a larger range of wavelengths.

The second coating 21 is selected and/or designed to have specific reflection properties. Specifically, the second coating 21 is selected and/or designed to substantially reflect light in the designated spectrum that is incident on the second coating 21 from within the transmissive element 13 at a reflection angle which is less than a second predetermined angle. At the same time, the second coating 21 is also selected and/or designed to substantially transmit light in the designated spectrum that is incident on the second coating 21 from within the transmissive element 13 at a transmission angle which is greater than the second predetermined angle. Again, substantial reflection means at least 99% reflection, and substantial transmission means at least 99% transmission. For HEL applications, it may be desirable to have the second coating 21 reflect at least 99.95% of light in the designated spectrum which has an internal angle of incidence on the second coating 21 that is less than the second predetermined angle and to have the second coating 21 transmit at least 99.95% of light in the designated spectrum which has an internal angle of incidence on the second coating 21 that is greater than the second predetermined angle.

In embodiments in which two internal reflections (one reflection on each of the entry surface 15 and the exit surface 17) are desired for light in the designated spectrum entering the transmissive element 13 at about normal incidence, the second predetermined angle may be greater than the wedge angle and less than three times the wedge angle. The amount that the second predetermined angle is greater than the wedge angle may determine how effective the second coating 21 is at achieving substantial reflection for light incident on the second coating from within the transmissive element at reflection angles that are less than the second predetermined angle. Similarly, the amount that the predetermined angle is less than three times the wedge angle may determine how effective the second coating 21 is at achieving substantial transmission for light incident on the second coating from within the transmissive element at transmission angles greater than the second predetermined angle. In practice, the second predetermined angle will generally be a parameter of the selected/designed second coating 21.

For alternative embodiments in which four internal reflections are desired, the second predetermined angle may be greater than about three times the wedge angle and less than about five times the wedge angle. Those of skill in the art will recognize that certain other embodiments may have more than four internal reflections, with the theoretical limit of the exit angle given by [number of reflections]×[wedge angle]<90° for a transmissive element that is not refractive. Those of skill in the art will also recognize that, in general, the more internal reflections which are included in the design of a beam directing device 11, the larger the transmissive device 13 will need to be to accommodate all the internal reflections.

For certain HEL applications, it may be desirable to have light incident on the entry surface 15 at about 1°-2° variance from normal incidence in order to reduce reflection back to the HEL source. For such a beam directing device 11, the first coating 19 should be selected and/or designed to be substantially transmissive for light incident within the variance range. This same variance should also be taken into account for each of the other angles of incidence (i.e. the reflection angle and the transmission angle) within the transmissive element 13, as described above, as part of the design of the beam directing device 11.

By way of example, an embodiment of the beam directing device 11 may be constructed for diverting an HEL beam centered about 1.06 μm wavelength. For this exemplary embodiment of the beam directing device 13, the transmissive element 13 is formed from borosilicate glass, and the wedge angle is approximately 7.2°. The transmissive element is configured to have a diameter of about 52 cm, the distance between the entry surface 15 and the exit surface 17 at the narrow end 25 of the transmissive element 13 is about 1 cm, and the distance between the entry surface 15 and the exit surface 17 at the wide end 27 of the transmissive element 13 is about 8.2 cm.

In this exemplary embodiment, the first coating 19 may be formed by a plurality of layers, and Table 1 lists the layers of the first coating 19. The first layer of the first coating 19 is deposited on the transmissive element 13, and the first coating 19 is formed by alternating layers of $Ta_2O_5$ and $SiO_2$. These two materials are chosen for their very low absorption at 1.06 μm wavelength and for their substantially different refractive indices. In other embodiments, other materials may be used to form the layers of the first coating 19, with the layer thicknesses being dependent upon the properties of the materials used and the wavelength of light for which the beam directing device 11 is to be used.

TABLE 1

Layers of First Coating

| Layer No. | Thickness (nm) | Material |
|---|---|---|
| 1 | 124.494 | $Ta_2O_5$ |
| 2 | 201.056 | $SiO_2$ |
| 3 | 113.693 | $Ta_2O_5$ |
| 4 | 229.798 | $SiO_2$ |
| 5 | 80.647 | $Ta_2O_5$ |
| 6 | 407.775 | $SiO_2$ |
| 7 | 73.22 | $Ta_2O_5$ |
| 8 | 238.19 | $SiO_2$ |
| 9 | 106.785 | $Ta_2O_5$ |
| 10 | 208.554 | $SiO_2$ |
| 11 | 115.299 | $Ta_2O_5$ |
| 12 | 202.326 | $SiO_2$ |
| 13 | 116.327 | $Ta_2O_5$ |
| 14 | 204.233 | $SiO_2$ |
| 15 | 111.44 | $Ta_2O_5$ |
| 16 | 216.751 | $SiO_2$ |
| 17 | 94.939 | $Ta_2O_5$ |
| 18 | 741.124 | $SiO_2$ |
| 19 | 90.496 | $Ta_2O_5$ |
| 20 | 223.026 | $SiO_2$ |
| 21 | 109.794 | $Ta_2O_5$ |
| 22 | 207.138 | $SiO_2$ |
| 23 | 115.75 | $Ta_2O_5$ |
| 24 | 203.716 | $SiO_2$ |
| 25 | 115.602 | $Ta_2O_5$ |
| 26 | 207.642 | $SiO_2$ |
| 27 | 109.237 | $Ta_2O_5$ |
| 28 | 224.738 | $SiO_2$ |
| 29 | 88.909 | $Ta_2O_5$ |
| 30 | 744.686 | $SiO_2$ |
| 31 | 95.96 | $Ta_2O_5$ |
| 32 | 215.294 | $SiO_2$ |
| 33 | 112.975 | $Ta_2O_5$ |
| 34 | 201.778 | $SiO_2$ |
| 35 | 118.961 | $Ta_2O_5$ |
| 36 | 197.574 | $SiO_2$ |
| 37 | 120.366 | $Ta_2O_5$ |
| 38 | 197.793 | $SiO_2$ |
| 39 | 118.401 | $Ta_2O_5$ |
| 40 | 202.531 | $SiO_2$ |
| 41 | 111.633 | $Ta_2O_5$ |
| 42 | 216.789 | $SiO_2$ |
| 43 | 93.611 | $Ta_2O_5$ |
| 44 | 758.82 | $SiO_2$ |
| 45 | 79.173 | $Ta_2O_5$ |
| 46 | 235.144 | $SiO_2$ |
| 47 | 105.744 | $Ta_2O_5$ |
| 48 | 211.144 | $SiO_2$ |
| 49 | 115.101 | $Ta_2O_5$ |
| 50 | 203.881 | $SiO_2$ |
| 51 | 117.749 | $Ta_2O_5$ |
| 52 | 203.315 | $SiO_2$ |
| 53 | 115.717 | $Ta_2O_5$ |
| 54 | 209.22 | $SiO_2$ |
| 55 | 106.953 | $Ta_2O_5$ |
| 56 | 231.636 | $SiO_2$ |
| 57 | 79.056 | $Ta_2O_5$ |
| 58 | 426.343 | $SiO_2$ |
| 59 | 43.559 | $Ta_2O_5$ |
| 60 | 269.736 | $SiO_2$ |
| 61 | 103.578 | $Ta_2O_5$ |
| 62 | 211.432 | $SiO_2$ |
| 63 | 124.458 | $Ta_2O_5$ |

Figure 3:
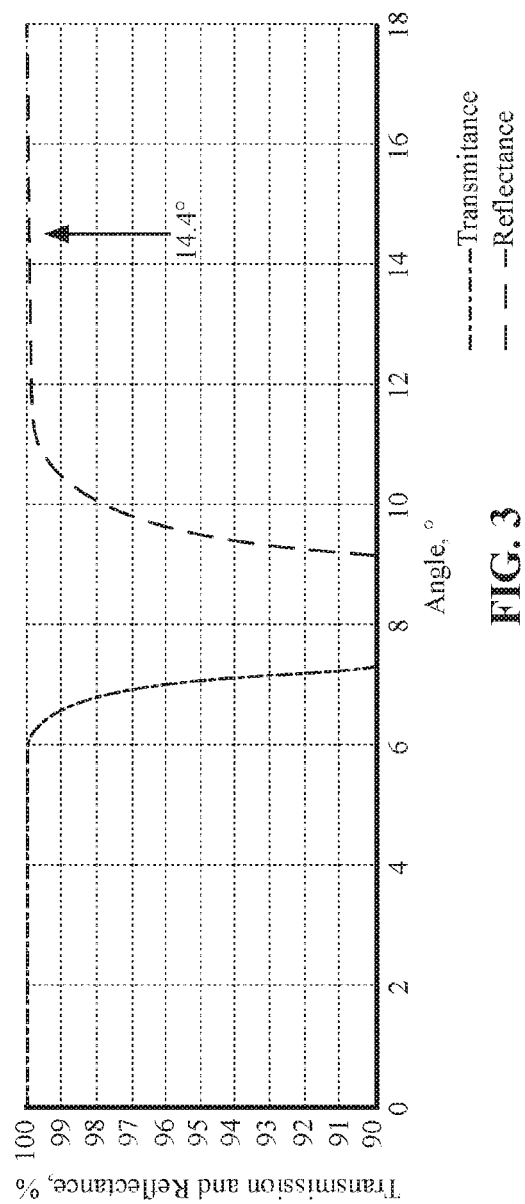
FIG. 3 is a graph showing transmission and reflectance of the coating of FIG. 3 for light at 1.06 µm wavelength.

By forming the first coating 19 according to Table 1, reflectance and transmission of light is achieved at 1.06 μm wavelength as shown in FIG. 3. As can be seen, the first coating 19 transmits almost all light at 1.06 μm wavelength when the angle of incidence is less than 6°, and there is a significant drop off in transmission just above an angle of incidence of 7.2°. This results in almost total transmission into the transmissive element 13 for light at 1.06 μm wavelength which has a normal angle of incidence external to the first coating 19. Similarly, the first coating 19 reflects substantial light at 1.06 µm wavelength at 12° angle of incidence and above, and almost all light at 1.06 µm wavelength at 14° angle of incidence and above, when the light is incident on the first coating 19 from within the transmissive element 13. This results in almost total internal reflection for light at 1.06 µm wavelength which is incident on the first coating 19 from within the transmissive element 13 at an angle of incidence of 14° or higher.

The second coating 21 may also be formed by a plurality of layers, and Table 2 lists the layers of the second coating 21 for this exemplary embodiment. The first layer of the second coating 21 is deposited on the transmissive element 13, and the second coating 21 is also formed by alternating layers of $Ta_2O_5$ and $SiO_2$. In other embodiments, other materials may be used to form the layers of the second coating 21, with the layer thicknesses being dependent upon the properties of the materials used and the wavelength of light for which the beam directing device 11 is to be used.

TABLE 2

Layers of Second Coating

| Layer No. | Thickness (nm) | Material |
|---|---|---|
| 1 | 248.233 | $SiO_2$ |
| 2 | 124.969 | $Ta_2O_5$ |
| 3 | 210.105 | $SiO_2$ |
| 4 | 50.665 | $Ta_2O_5$ |
| 5 | 231.461 | $SiO_2$ |
| 6 | 101.896 | $Ta_2O_5$ |
| 7 | 438.446 | $SiO_2$ |
| 8 | 127.819 | $Ta_2O_5$ |
| 9 | 206.074 | $SiO_2$ |
| 10 | 124.796 | $Ta_2O_5$ |
| 11 | 192.682 | $SiO_2$ |
| 12 | 124.664 | $Ta_2O_5$ |
| 13 | 190.497 | $SiO_2$ |
| 14 | 125.856 | $Ta_2O_5$ |
| 15 | 191.322 | $SiO_2$ |
| 16 | 112.008 | $Ta_2O_5$ |
| 17 | 832.704 | $SiO_2$ |
| 18 | 111.508 | $Ta_2O_5$ |
| 19 | 189.817 | $SiO_2$ |
| 20 | 115.245 | $Ta_2O_5$ |
| 21 | 186.429 | $SiO_2$ |
| 22 | 120.001 | $Ta_2O_5$ |
| 23 | 184.299 | $SiO_2$ |
| 24 | 117.764 | $Ta_2O_5$ |
| 25 | 188.279 | $SiO_2$ |
| 26 | 123.867 | $Ta_2O_5$ |
| 27 | 195.639 | $SiO_2$ |
| 28 | 123.176 | $Ta_2O_5$ |
| 29 | 258.262 | $SiO_2$ |
| 30 | 218.492 | $Ta_2O_5$ |
| 31 | 261.229 | $SiO_2$ |
| 32 | 127.887 | $Ta_2O_5$ |
| 33 | 193.712 | $SiO_2$ |
| 34 | 108.432 | $Ta_2O_5$ |
| 35 | 182.325 | $SiO_2$ |
| 36 | 98.923 | $Ta_2O_5$ |
| 37 | 174.978 | $SiO_2$ |
| 38 | 111.044 | $Ta_2O_5$ |
| 39 | 181.224 | $SiO_2$ |
| 40 | 123.499 | $Ta_2O_5$ |
| 41 | 195.761 | $SiO_2$ |
| 42 | 127.937 | $Ta_2O_5$ |
| 43 | 814.942 | $SiO_2$ |
| 44 | 127.999 | $Ta_2O_5$ |
| 45 | 203.625 | $SiO_2$ |
| 46 | 65.807 | $Ta_2O_5$ |

Figure 4:
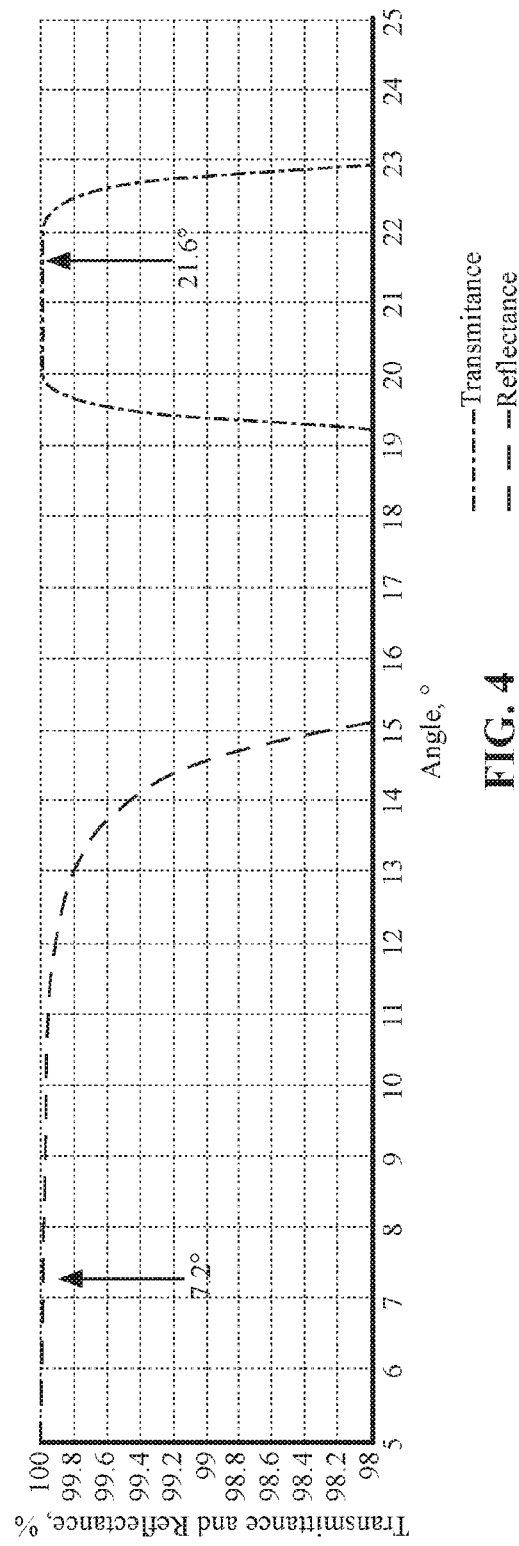
FIG. 4 is a graph showing transmission and reflectance of the coating of FIG. 5 for light at 1.06 µm wavelength.

By forming the second coating 21 according to Table 2, reflectance and transmission of light is achieved at 1.06 µm wavelength as shown in FIG. 4. As can be seen, the second coating 21 reflects substantial light at 1.06 µm wavelength at 9° angle of incidence and below, and almost all light at 1.06 µm wavelength at 8° angle of incidence and below, when the light is incident on the second coating 21 from within the transmissive element 13. This results in almost total internal reflection for light at 1.06 µm wavelength which is incident on the second coating 21 from within the transmissive element 13 at an angle of incidence of about 7.2°. Similarly, the second coating 21 transmits almost all light at 1.06 µm wavelength when the angle of incidence is between 20°-22° when the light is incident on the second coating 21 from within the transmissive element 13. This results in almost total transmission out of the transmissive element 13 for light at 1.06 µm wavelength which is incident on the second coating 21 from within the transmissive element 13 at an angle of incidence between 20°-22°.

Figure 5B:
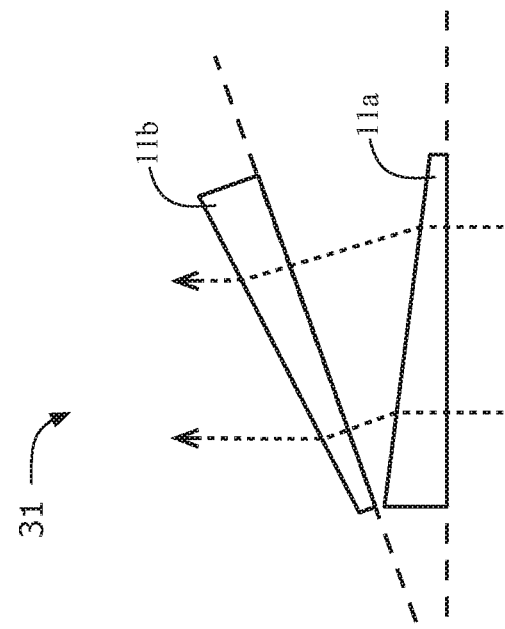
FIG. 5B is a schematic view of a second operational orientation of beam directing devices within a beam director.
Figure 5A:
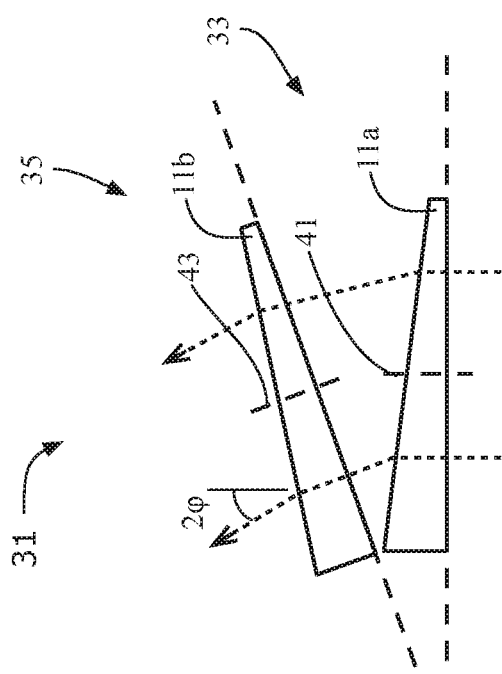
FIG. 5A is a schematic view of a first operational orientation of beam directing devices within a beam director.

FIG. 5A shows a first rotational configuration of a beam directing assembly 31 which includes two beam directing stages 33, 35. In certain embodiments, the beam directing assembly 31 may include three or more beam directing stages. For example, the beam directing assembly 31 may include three beam directing stages in order to eliminate a pointing singularity in the forward direction which is present in the beam directing assembly 31 shown in FIG. 5A. Each beam directing stage includes a beam directing device 11a, 11b, and each beam directing device 11a, 11b is independently rotatable with respect to the other beam directing device 11a, 11b. The beam directing stages 33, 35 may also include any appropriate framework, housing, or mechanisms which enable relative rotation of the beam directing devices 11a, 11b with respect to each other. The beam directing devices 11a, 11b preferably are identical in configuration and construction. However, in certain embodiments, the two beam directing devices 11a, 11b may vary in one or more properties from the other. In embodiments with more than two beam directing stages, at least one of the beam directing devices may vary in one or more properties as compared to the other beam directing devices.

In this beam directing assembly 31, each of the beam directing devices 11a, 11b is aligned, relative to the beam entering each respective beam directing device 11a, 11b, as described and shown in FIG. 2, and each is optically coupled to the other beam directing device 11a, 11b. Further, each beam directing stage 33, 35 includes an axis of rotation 41, 43, and each beam directing device 11a, 11b is rotatable about the axis of rotation 41, 43 for each respective beam directing stage 33, 35.

The axis of rotation 41, 43 of each first beam directing stage 33, 35 is normal to the entry surface of the respective beam directing device 11a, 11b. The axis of rotation 41, 43 for the second beam directing stage 35 is parallel to the exit angle associated with the first beam directing device 11a. In addition, the entry surface of the second beam directing device 11b is orthogonal to the axis of rotation of the first beam directing stage 33. In certain embodiments, and particularly for HEL applications, these alignments may be off by 1°-2° in order to reduce reflection back to the HEL source.

In the configuration of the beam directing assembly 31 shown in FIG. 5A, each beam directing device 11a, 11b, 11c deflects the path of the beam by ψ, with the combined deflection of all three beam directing devices 11a, 11b, 11c being 3ψ. This is the maximum deflection of the beam directing assembly 31. In comparison, FIG. 5B illustrates the same beam directing assembly 31 with a different rotational configuration of the third beam directing device 11c. In this configuration, the third beam directing device 11c is rotated by 180° as compared to the configuration of FIG. 5A. In this second configuration, the first and second beam directing devices 11a, 11b deflect the beam in a first direction by a total of 2ψ, while the third beam directing device 11c deflects the beam in the opposite direction by a total of ψ. The total deflection of the beam passing through the beam directing assembly 31 with this configuration is therefore ψ. Many different configurations of the beam directing assembly 31 are possible by rotating one or more of the beam directing devices 11a, 11b, 11c relative to the other beam directing devices 11a, 11b, 11c, such that the net deflection of the beam may anywhere between 0° and 3ψ.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A beam directing device comprising:
   a transmissive element having an entry surface disposed in a first plane and an exit surface disposed in a second plane, wherein the first and second planes intersect to form a wedge angle;
   a first coating on the entry surface, the first coating configured to substantially transmit a predetermined spectrum of light incident on the first coating from external to the transmissive element at about a normal angle of incidence and to substantially reflect the predetermined spectrum of light incident on the first coating from within the transmissive element at about two times the wedge angle; and
   a second coating on the exit surface, the second coating configure to substantially reflect the predetermined spectrum of light incident on the second coating from within the transmissive element at about the wedge angle and to substantially transmit the predetermined spectrum of light incident on the second coating from within the transmissive element at about three times the wedge angle.

2. The beam directing device of claim 1, wherein the first coating is configured to transmit more than 99% of the predetermined spectrum of light incident on the first coating from external to the transmissive element at about the normal angle of incidence.

3. The beam directing device of claim 1, wherein the first coating is configured to reflect more than 99% of the predetermined spectrum of light incident on the first coating from within the transmissive element at about two times the wedge angle.

4. The beam directing device of claim 1, wherein the second coating is configured to reflect more than 99% of the predetermined spectrum of light incident on the second coating from within the transmissive element at about the wedge angle.

5. The beam directing device of claim 1, wherein the second coating is configured to transmit more than 99% of the predetermined spectrum of light incident on the second coating from within the transmissive element at about three times the wedge angle.

6. The beam directing device of claim 1, wherein transmissive element, the wedge angle, the first coating, and the second coating in combination cause the predetermined spectrum of light incident on the first coating from external to the transmissive element at about the normal angle of incidence to exit the second coating at an exit angle of up to about 25° off the normal angle of incidence.

7. The beam directing device of claim 1, wherein the transmissive element has a refractive index of at least 1.

8. The beam directing device of claim 1, wherein the transmissive element is formed from one of fused silica, zinc sulfide, and borosilicate glass.

9. The beam directing device of claim 1, wherein the wedge angle is about 7.2°.

10. The beam directing device of claim 1, wherein the predetermined spectrum includes wavelengths between about 1055 μm and 1065 μm.

11. The beam directing device of claim 1, wherein at least one of the first coating and the second coating is formed of a plurality of layers.

12. A beam directing device comprising:
    a transmissive element having an entry surface disposed in a first plane and an exit surface disposed in a second plane, wherein the first and second planes intersect to form a wedge angle;
    a first coating on the entry surface, the first coating configured to substantially transmit a predetermined spectrum of light incident on the first coating from external to the transmissive element at about a normal angle of incidence and to substantially reflect the predetermined spectrum of light incident on the first coating from within the transmissive element at greater than a first predetermined angle which is greater than the wedge angle; and
    a second coating on the exit surface, the second coating configure to substantially reflect the predetermined spectrum of light incident on the second coating from within the transmissive element at a reflection angle which is less than a second predetermined angle and to substantially transmit the predetermined spectrum of light incident on the second coating from within the transmissive element at a transmission angle which is greater than the second predetermined angle.

13. The beam directing device of claim 12, wherein the first coating is configured to transmit more than 99% of the predetermined spectrum of light incident on the first coating from external to the transmissive element at about the normal angle of incidence.

14. The beam directing device of claim 12, wherein the first coating is configured to reflect more than 99% of the predetermined spectrum of light incident on the first coating from within the transmissive element at greater than the first predetermined angle.

15. The beam directing device of claim 12, wherein the second coating is configured to reflect more than 99% of the predetermined spectrum of light incident on the second coating from within the transmissive element at the reflection angle.

16. The beam directing device of claim 12, wherein the second coating is configured to transmit more than 99% of the predetermined spectrum of light incident on the second coating from within the transmissive element at the transmission angle.

17. The beam directing device of claim 12, wherein transmissive element, the wedge angle, the first coating, and the second coating in combination cause the predetermined spectrum of light incident on the first coating from external to the transmissive element at about the normal angle of incidence to exit the second coating at an exit angle of up to about 80° off the normal angle of incidence.

18. The beam directing device of claim 12, wherein the transmissive element has a refractive index of at least 1.

19. The beam directing device of claim 12, wherein the transmissive element is formed from one of fused silica, zinc sulfide, and borosilicate glass.

20. The beam directing device of claim 12, wherein the wedge angle is about 7.2°.

21. The beam directing device of claim 12, wherein the predetermined spectrum includes wavelengths between about 1055 µm and 1065 µm.

22. The beam directing device of claim 12, wherein at least one of the first coating and the second coating is formed of a plurality of layers.

23. A beam director comprising:
a first beam directing stage and a second beam directing stage, each beam directing stage comprising:
a transmissive element having an entry surface disposed in a first plane and an exit surface disposed in a second plane, wherein the first and second planes intersect to form a wedge angle;
a first coating on the entry surface, the first coating configured to substantially transmit a predetermined spectrum of light incident on the first coating from external to the transmissive element at about a normal angle of incidence and to substantially reflect the predetermined spectrum of light incident on the first coating from within the transmissive element at greater than a first predetermined angle which is greater than the wedge angle; and
a second coating on the exit surface, the second coating configure to substantially reflect the predetermined spectrum of light incident on the second coating from within the transmissive element at a reflection angle which is less than a second predetermined angle and to substantially transmit the predetermined spectrum of light incident on the second coating from within the transmissive element at a transmission angle which is greater than the second predetermined angle,
wherein:
the first beam directing stage has a first axis of rotation, and the second beam directing stage has a second axis of rotation, such that each beam directing stage is rotatable with respect to the other beam directing stage;
an axis of rotation of the second beam directing stage is parallel to an exit angle associated with the transmissive element of the first beam directing stage; and
the entry surface of the transmissive element of the second beam directing stage is orthogonal to the axis of rotation.

24. The beam director of claim 23, wherein the refractive index of at least one of the first transmissive element and the second transmissive element is at least 1.

25. The beam director of claim 23, wherein at least one of the first transmissive element and the second transmissive element is formed from one of fused silica, zinc sulfide, and borosilicate glass.

26. The beam director of claim 23, wherein the wedge for at least one of the first transmissive element and the second transmissive element angle is about 7.2°.

27. The beam director of claim 23, wherein the predetermined spectrum includes wavelengths between about 1055 µm and 1065 µm.

28. The beam director of claim 23, wherein, for at least one of the first transmissive element and the second transmissive element, at least one of the first coating and the second coating is formed of a plurality of layers.

* * * * *